United States Patent [19]

Wilson et al.

[11] 4,367,370
[45] Jan. 4, 1983

[54] POWER PANEL SYSTEM WITH SELECTIVE MULTIPLE CIRCUITS

[75] Inventors: Harold R. Wilson; Ditmar K. Tillmann, both of Holland, Mich.

[73] Assignee: Haworth Mfg., Inc., Holland, Mich.

[21] Appl. No.: 44,514

[22] Filed: Jun. 1, 1979

[51] Int. Cl.³ .............................................. H02G 3/28
[52] U.S. Cl. .................................... 174/48; 160/127; 307/38; 200/51.06
[58] Field of Search ..................... 174/48, 49; 160/127, 160/135, 351; 52/220, 221, 173, 239; 339/22 R, 22 B, 23, 32 R, 32 M, 18; 307/38, 147; 200/51.02, 51.03, 51.04, 51.05, 51.06

[56] References Cited

U.S. PATENT DOCUMENTS

| | | |
|---|---|---|
| 2,313,452 | 3/1943 | O'Brien ................................. 339/23 |
| 3,715,627 | 2/1973 | D'Ausilio . | |
| 4,043,626 | 8/1977 | Propst et al. ........................... 339/23 |
| 4,060,294 | 11/1977 | Haworth et al. ........................ 339/4 |
| 4,135,775 | 1/1979 | Driscoll ............................. 339/22 R |
| 4,199,206 | 4/1980 | Haworth et al. ........................ 339/4 |
| 4,203,639 | 5/1980 | VandenHoek et al. . | |
| 4,278,834 | 7/1981 | Boundy ................................. 174/48 |

FOREIGN PATENT DOCUMENTS 1579078 7/1969 France ............................. 339/32 M

OTHER PUBLICATIONS

Brochure Entitled "Westinghouse ASD Power and Communications Distribution System".

Brochure Entitled "Steelcase", 1978.

Primary Examiner—A. T. Grimley
Assistant Examiner—D. A. Tone
Attorney, Agent, or Firm—Blanchard, Flynn, Thiel, Boutell & Tanis

[57] ABSTRACT

A panel-type wall system wherein each panel has a pair of electrically connected power blocks disposed adjacent the lower corners thereof. The opposed power blocks of adjacent panels are electrically joined together by a flexible electrical connector which plugs into adjacent power blocks. The power blocks and connectors define an electrical system which extends longitudinally throughout the series of connected panels. The electrical system is preferably a five-wire system to provide three different available circuits at each power block. Each power block is provided with several connector portions for permitting electrical power to be tapped therefrom. Different types of power-taps can be plugged into the power blocks. More specifically, the power-taps include a receptacle unit which can be selectively plugged into either or both sides of each power block, and a light-fixture plug which can also be plugged into each power block. Each of these power-taps has a simple manually actuatable switch associated therewith so the power-tap, when plugged into the power block, can be electrically joined to any selected one of the three circuits. The power-tap also provides a visual indication as to which circuit has been selected.

19 Claims, 21 Drawing Figures

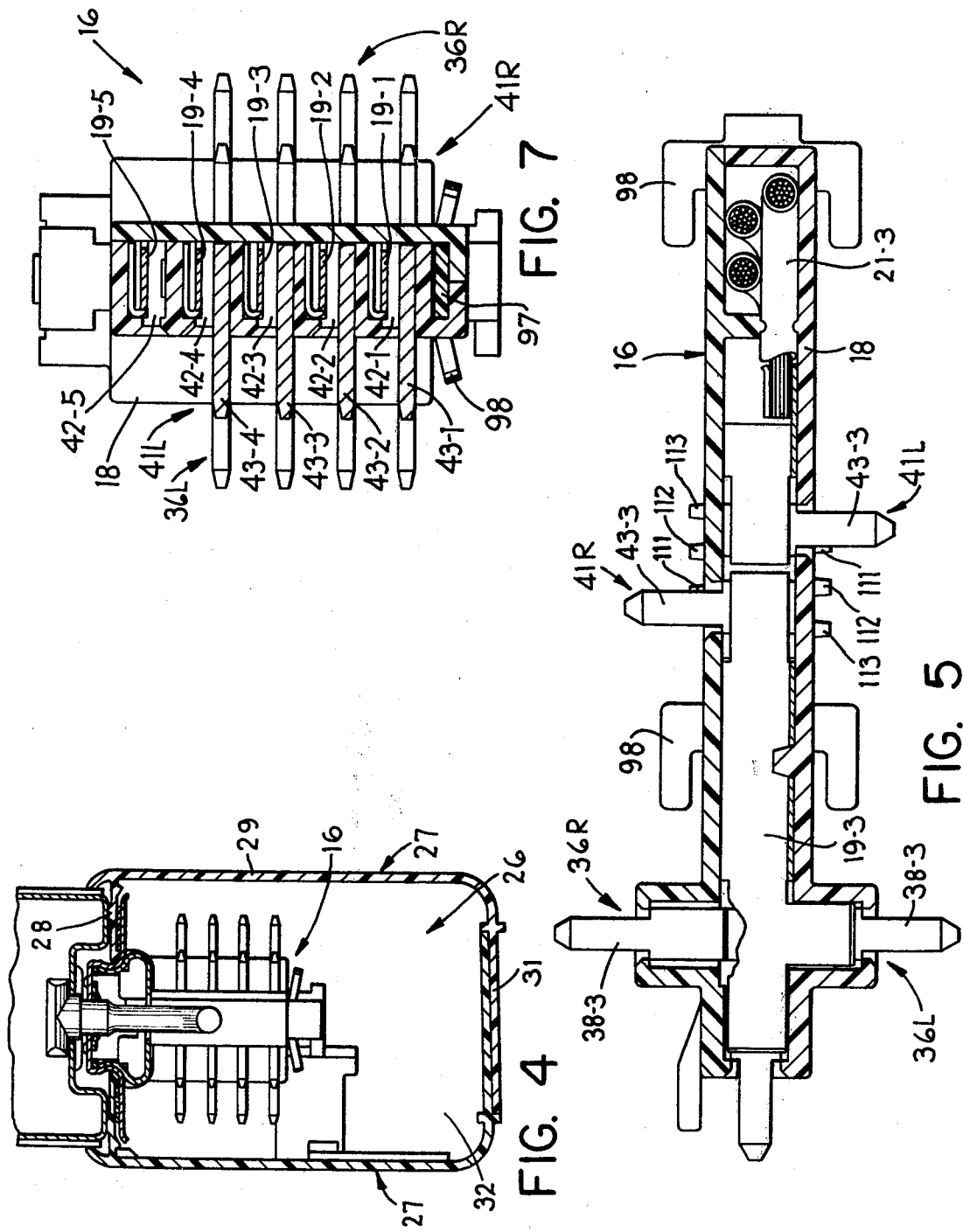

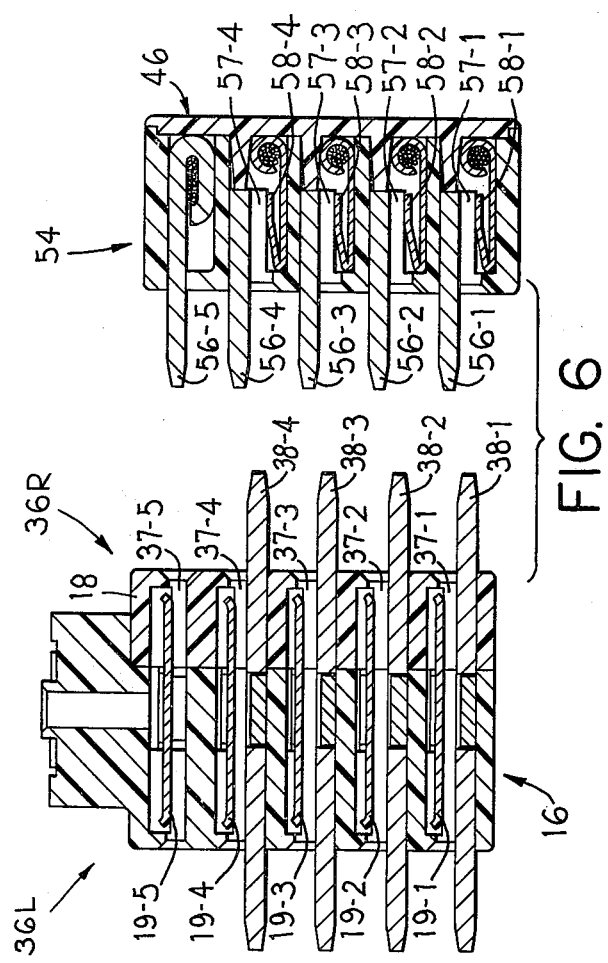

POWER PANEL SYSTEM WITH SELECTIVE MULTIPLE CIRCUITS

FIELD OF THE INVENTION

This invention relates to a wall system formed from a plurality of series-connected electrically-prewired panels and, more specifically, to an improved wall system wherein power-taps such as for light-fixtures and conventional electrical receptacles, can be selectively positioned on the panels and selectively switchably connected, at their point of use, to any one of a plurality of different circuits.

BACKGROUND OF THE INVENTION

U.S. Pat. No. 4,060,294 and co-pending application Ser. No. 918,278, both owned by the assignee of this application, disclose interior wall systems of the type used for dividing offices and other interior regions into smaller work areas. These systems include a plurality of prefabricated panels releasably joined together and individually electrically prewired to facilitate the supplying of electrical energy to areas bounded by the wall system. While these known wall systems are highly desirable and have met with substantial commercial success, nevertheless continued development has been carried out in an attempt to further improve upon the usability and flexibility of such systems.

In one recently developed wall system, the individual panels are provided with power blocks adjacent the opposite lower corners thereof, which power blocks each accommodate two flexible electrical connectors for transmitting electrical energy to an adjacent panel. In this system, each power block has a single connector unit disposed on only one side thereof so that a single receptacle unit can be plugged into the power block adjacent only one end of each side of the panel. In another known system, the panel is again provided with a pair of power blocks adjacent the opposite lower corners, and the opposite sides of each power block are provided with a socket or recess for accommodating therein either a single receptacle or a dummy outlet plug.

In both of the latter described wall systems, while each is a four-wire system so as to provide two electrical circuits, nevertheless one circuit is reserved exclusively for lighting-fixtures which are adapted for mounting on the panels adjacent the upper edges thereof, whereby all of the receptacles or outlets as associated with all of the panels in the series are thus connected solely to the other circuit. This thus greatly restricts the flexibility and usability of such wall systems in that most municipal codes only permit a limited number of outlets or receptacles to be series-connected to a single circuit. These known systems have thus required a greater number of power-feed taps for connection to suitable ceiling or floor-mounted power terminals, whereby the flexibility of the overall system is severely impaired. In addition, by limiting all of the outlets to a single circuit, this prevents random or selective distribution of receptacles among different circuits, and hence invariably results in a concentration of heavily used outlets, which results in overloading of the system. These known systems thus have severe limitations as regards use of the wall system and the number of panels which can be connected in series, inasmuch as all receptacles are restricted for connection in series within a single circuit. Similarly, all light-fixtures are restricted for series connection to a second circuit. These wall systems thus provide no decision-making capability or circuit selection at the point of use, thereby not only restricting the use and capabilities of the system, both in terms of the system size (i.e., number of panels) and its proposed use, but also its capability of use and conversion in situations requiring substantially larger numbers of panels and substantially more complex electrical systems and arrangements.

Accordingly, it is an object of this invention to provide an improved upright wall or space-divider system formed from a plurality of series-connected electrically-prewired panels, which system overcomes the disadvantages of prior systems by greatly improving the flexibility, usability, capacity and adaptability of the system by providing a plurality of separate electrical circuits, such as three circuits, which extend throughout the system, with individual power-tap units (such as receptacle units) being selectively mounted on the panels at desired use locations and selectively switched for connection to the desired circuit.

Thus, it is an object of this invention to provide an improved wall system of the aforesaid type, and more specifically a system wherein each panel has a pair of power blocks positioned thereon adjacent the opposite corners thereof, with each power block having a pair of connector portions so that the power blocks of adjacent panels can be electrically joined together by a flexible electrical connector which can be joined to either of the opposed pairs of connector portions as associated with the power blocks, and which system includes plug-type connectors for lighting-fixtures and plug-type receptacle units which can be selectively connected to any of the power blocks, the receptacle units and lighting-fixture connectors all having manually movable circuit selecting switch means associated therewith to permit their selective inclusion, at the point of use, within any of the multiple circuits which extend throughout the series-connected panels.

Accordingly, it is an object of this invention to provide:

(1) A wall system, as aforesaid, which restores to the electrician the decision-making capability with respect to circuit selection, but involves a system which is already prewired so that the installation and the stringing of wires by the electrician is eliminated, but wherein the electrician is able to perform the circuit-selecting function at each individual point of use by manual displacement of a single switch as located at each power-tap location, such as at each receptacle unit and at each light-fixture plug.

(2) A wall system, as aforesaid, which provides a plurality of separate electrical circuits, preferably at least three, which circuits extend in parallel throughout the length of the wall system so as to both substantially increase the number of panels which can be connected in series and permit the individual receptacle units and light-fixture plugs to be individually connected to any of the selected circuits so that the power-taps for the different circuits can be randomly interwoven and dispersed in an irregular and nonsequential manner to achieve maximum distribution and utilization of the available circuits.

(3) A wall system, as aforesaid, which permits selective on-site placement of receptacle units in a simple and efficient manner, while at the same time providing maximum versatility in that a receptacle unit (involving either a single or a duplex outlet) can be selectively mounted adjacent either end of each panel on either or both sides thereof, with said receptacle unit being easily accessible for mounting on or removal from the power blocks of the individual panels whenever desired.

(4) A wall system, as aforesaid, wherein appropriate indicating devices are associated at all of the switchable power-tap locations, such as associated with the receptacle units and the light-fixture plugs, so as to readily indicate the selected circuit to which the individual power-tap is connected, with the power-taps themselves having suitable locking structure which prevents the switching thereof except when the power-tap is disconnected from the power block.

(5) A wall system, as aforesaid, which provides a greatly improved visual appearance when fully assembled, which provides maximum flexibility and versatility while at the same time utilizing a minimum number of parts, and which provides a greatly enlarged and conveniently accessible communication channel within the lower raceway to permit the passage therethrough of substantially greater numbers of communication cables.

(6) A wall system, as aforesaid, which results in all of the wiring components and communication cables being effectively hidden and enclosed within a raceway which extends along the lower edge of each panel, which raceway appears as an integral portion of the panel and has a width substantially the same as the panel, and which raceway itself extends to the vertical edges of the panel so that both electrical and communication cables can pass between panels in such a manner as to create no visually unattractive appearance.

Other objects and purposes of the invention will be apparent to persons familiar with systems of this type upon reading the following specification and inspecting the accompanying drawings.

SUMMARY OF THE INVENTION

In the improved wall system of this invention, each panel has a pair of electrically connected power blocks disposed adjacent the lower corners thereof, and the opposed power blocks of adjacent panels are electrically joined together by a flexible electrical connector which plugs into the adjacent power blocks. The power blocks and the connectors thus define an electrical system which extends longitudinally throughout the series of connected panels, the electrical system preferably being a five-wire type so as to provide three different available circuits at each power block. Each power block is provided with several connectors for permitting electrical power to be tapped therefrom. Different types of power-taps can be plugged into the power blocks. More specifically, the power-taps include a receptacle unit which can be selectively plugged into either or both sides of each power block, and a light-fixture plug which can also be plugged into each power block. Each of these power-taps has a simple manually actuatable switch associated therewith so that the power-tap, when plugged into the power block, can be electrically joined to any selected one of the three circuits. The power-tap, in association with the power block, also provides a visual indication as to which circuit has been selected.

BRIEF DESCRIPTION OF THE DRAWINGS

FIGS. 4, 5 and 7 are enlarged sectional views as taken along lines IV—IV, V—V and VII—VII respectively, In FIG. 2.

FIG. 6 is an enlarged sectional view of the power block and flexible connector, parts thereof taken along lines VI—VI as appearing in FIGS. 2 and 20.

Figure 1:
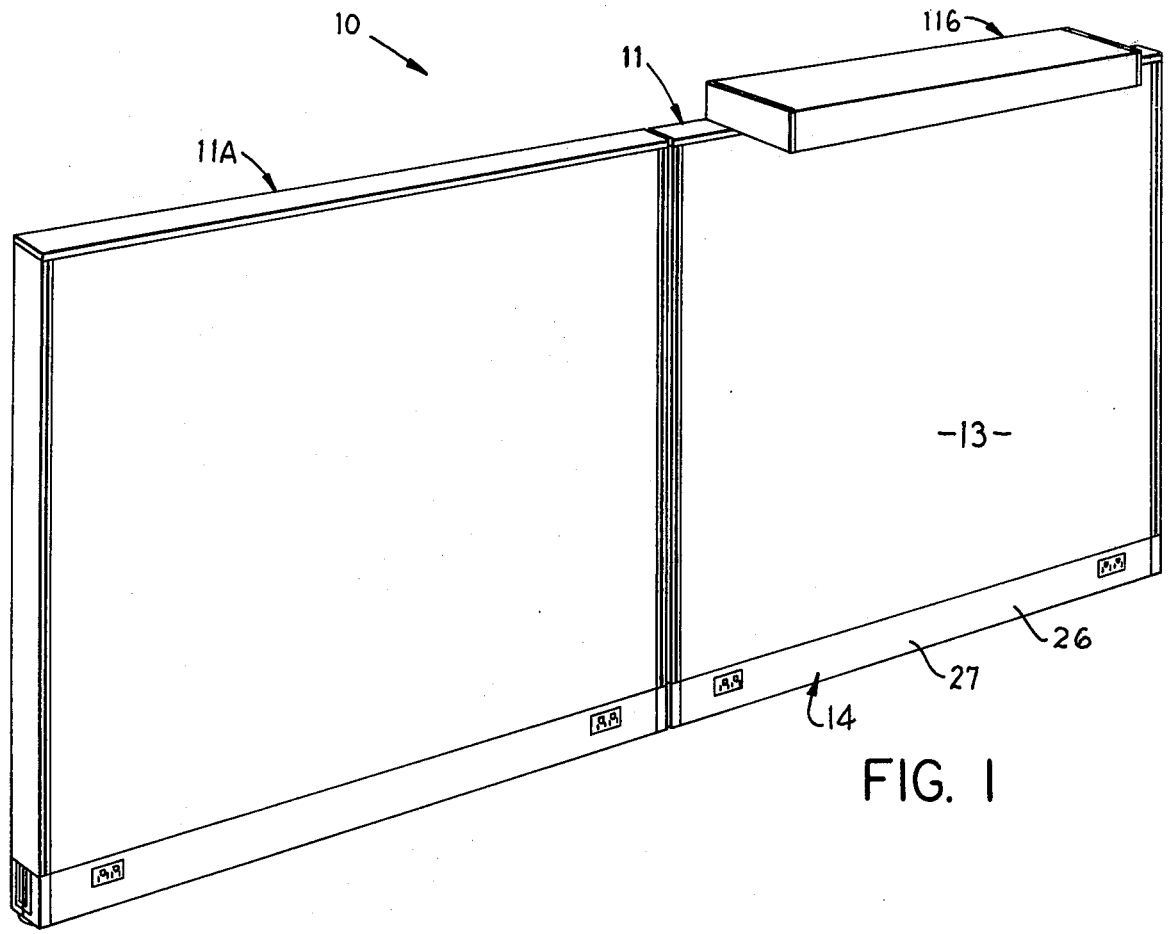
FIG. 1 is a perspective view illustrating a wall system according to the present invention, only two panels being horizontally series-connected for purposes of illustration.

Certain terminology will be used in the following description for convenience in reference only and will not be limiting. For example, the words "upwardly", "downwardly", "leftwardly" and "rightwardly" will refer to directions in the drawings to which reference is made. The words "inwardly" and "outwardly" will refer to directions toward and away from, respectively, the geometric center of the panel and designated components. Said terminology will include the words specifically mentioned, derivatives thereof and words of similar import.

DETAILED DESCRIPTION

FIG. 1 illustrates a wall system 10 formed by a series of interconnected upright prefabricated wall panels, only two substantially identical panels 11 and 11A being illustrated. Panels of different lengths can be serially interconnected.

Figure 1A:
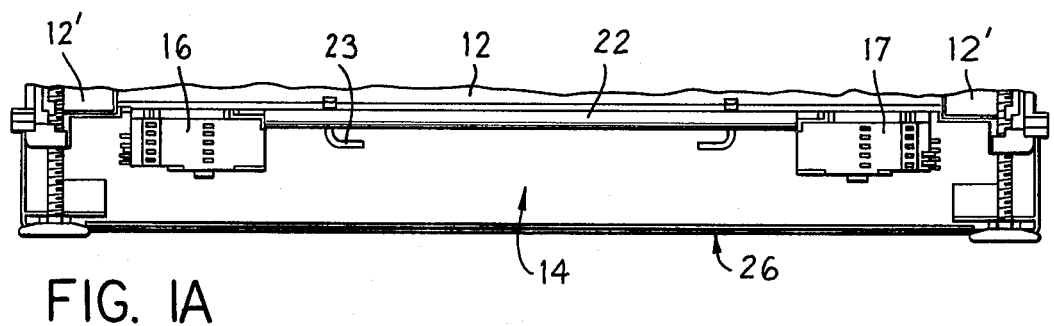
FIG. 1A is an enlarged, fragmentary view illustrating the prewired raceway, with cover removed, as associated with the lower edge of the panel.

Each panel, such as panel 11, includes an internal rigid rectangular frame formed by parallel top and bottom rails rigidly joined together by parallel side rails, the bottom rail 12 and side rails 12' being partially illustrated in FIG. 1A. These rails are of channel-shaped configuration and open inwardly of the panel, whereby the frame confines therein a suitable core structure, normally a honeycomb layer or similar conventional structure. The core and frame are normally sandwiched between thin facing sheets disposed on opposite sides of the frame, which sheets in turn are normally covered by a suitable fabric, the latter defining the exterior side faces 13 of the panel. The structure of panel 11 is well known, and one such structure is disclosed in U.S. Pat. No. 4,060,294, which patent also discloses the L-shaped plastic hinge used for hingedly connecting the adjacent vertical edges of two panels together.

The panel 11 (as well as panel 11A) is provided with a prewired electrical system 14 extending longitudinally along the lower edge thereof, which system includes identical power blocks 16 and 17 disposed adjacent the opposite lower corners of the panel, as illustrated in FIG. 1A. The power blocks 16 and 17 each include a box-like housing 18 constructed of an electrically insulative material and supporting therein five electrically conductive plates designated 19-1 through 19-5 (FIGS. 6 and 7), which plates are electrically insulated from one another. The five conductive plates 19 of power blocks 16 and 17 are individually electrically connected by five wire conductors 21 which extend between the power blocks 16 and 17, which conductors 21 extend through an elongated closed channel 22. This latter channel 22 extends between and rigidly joins the housings of the power blocks 16 and 17 together, and the channel 22 is in turn fixedly but releasably connected to the under side of the bottom frame rail 12 by means of locking handles 23.

A raceway 26 is defined along the horizontally extending lower edge of the panel 11 so as to enclose the power system 14 therein. The raceway 26 is formed by a pair of substantially identical, elongated L-shaped covers 27 which cooperate with one another and with the bottom rail 12 to define a closed channel substantially as illustrated in FIG. 4. Each L-shaped cover 27 includes an upper locking tab 28 which permits the cover to be fixedly but releasably secured to the panel. Each cover also includes a vertical leg 29 which projects downwardly and is then bent inwardly to form an integral bottom leg 31. The two opposed covers 27 cooperate, when mounted on the panel, to define therein a closed passage 32 which extends longitudinally along the lower edge of the panel, which passage 32 is isolated from the wire-confining channel 22 so as to enable communication cables or the like to be fed therethrough. The channel 32 is of sufficient size to permit three conventional Amphenol connectors to be positioned therein.

Each power block 16 and 17 has a pair of identical connector portions 36 associated therewith, which portions face outwardly toward opposite sides of the power block and are identified as 36R and 36L (FIGS. 3 and 6) for purposes of identification. Each said connector portion 36 includes a series of five vertically spaced openings or slots 37 formed in the power block housing, which slots are designated 37-1 through 37-5 and extend completely through the power block so as to comprise a part of both connector portions 36R and 36L. Each connector portion 36 also includes a set of four conductive blades or prongs 38-1 through 38-4 which project outwardly from the power block. The prongs 38 associated with the connector portion 36R are isolated from the prongs associated with the opposite connector portion 36L. Further the prongs 38-1 through 38-4 are respectively separated from the conductive plates 19-1 through 19-4 by means of the slots 37-1 through 37-4.

Each power block 16 and 17 also has a further pair of connector portions 41R and 41L associated with the opposite sides thereof, which connector portions are longitudinally staggered or offset relative to one another. These connector portions 41R and 41L are identical and each includes a set of five vertically spaced slots or openings 42-1 through 42-5, and a set of four conductive prongs 43-1 through 43-4 projecting outwardly of the power block housing. The prongs 43 associated with the connector portion 41L are individually separated from the prongs associated with the opposite connector portion 41R. Further, each prong 43 is separated from its respectively adjacent conductive plate 19 by means of the intermediate slot 42.

Figure 3:
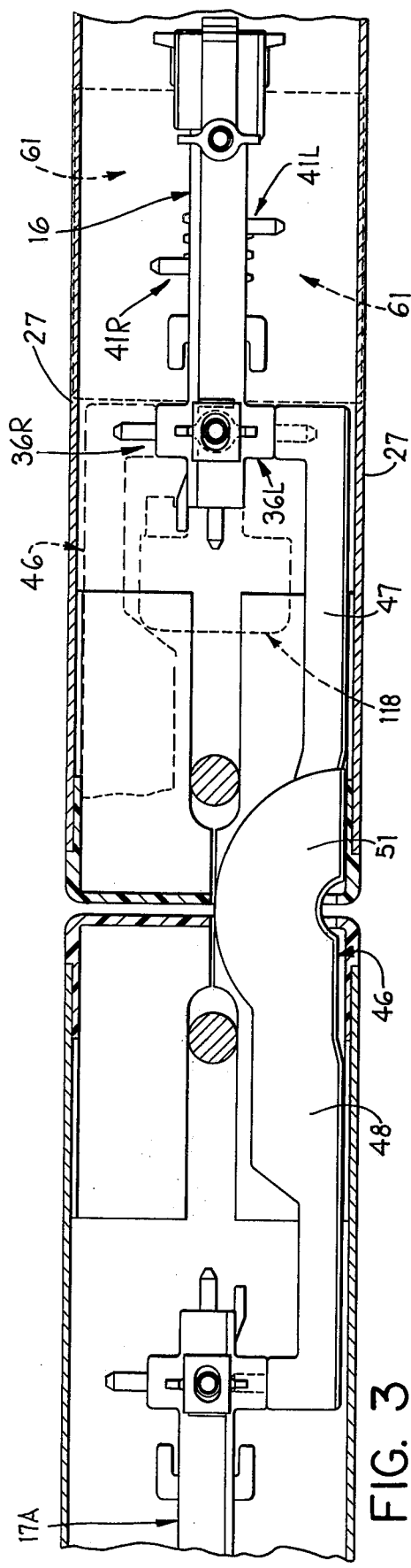
FIG. 3 is a fragmentary sectional view taken along line III—III in FIG. 2, but expanded to include a second panel and the electrical connector between adjacent panels.
Figure 20:
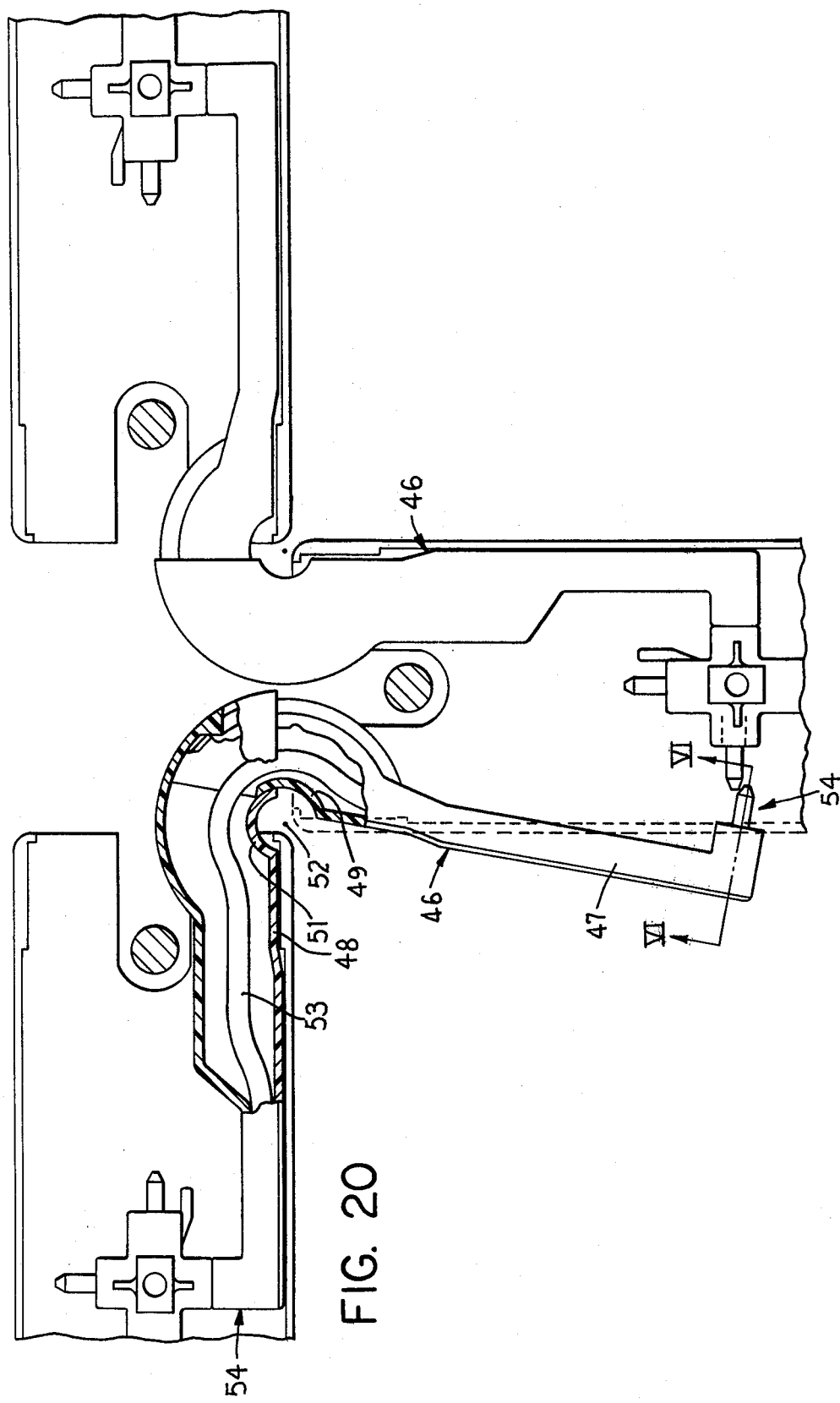
FIG. 20 is a fragmentary, partial sectional view illustrating three panels electrically joined together.

To electrically interconnect adjacent panels such as 11 and 11A, the adjacent power blocks 16 and 17A are electrically joined by a flexible electrical connector 46 as indicated in FIGS. 3 and 20. This connector 46 includes a pair of rigid housing parts 47 and 48 which have arcuate interfitting hinge portions 49 and 51 for enabling the two housing parts to be horizontally angularly displaced about an axis 52 which is substantially aligned with the hinge axis of the hinge structure which joins the adjacent panels together. The housing parts 47 and 48 are hollow and have therein plural, here five, wires 53 which extend therethrough for transmitting electrical energy between the identical connector portions 54 as disposed on opposite ends of the flexible connector 46.

Each connector portion 54, as illustrated in FIG. 6, includes a set of five electrically conductive prongs 56-1 through 56-5. The uppermost prong 56-5 is directly connected to one of the wires which extends through the flexible connector, namely the ground wire. The remaining four prongs all have a slot or opening 57-1 through 57-4 respectively associated therewith, which slots respectively separate the prongs 56-1 through 56-4 from the conductive plates 58-1 through 58-4 as provided within the ends of the respective housing parts 47 and 48. These latter conductive plates 58-1 through 58-4 are individually connected directly to the remaining four electrical wires which extend through the flexible connector.

The connector portions 54 are designed for creating a plug-type connection with either of the connector portions 36R or 36L as associated with the power blocks, the relationship between the connector portions 36 and 54 being illustrated in slightly separated relationship in FIG. 6. When the connector portions 54 and 36 are plugged together, the prongs 56 enter into the slots 37 so that prongs 38 are electrically interconnected to the conductive plates 19, and simultaneously the prongs 38 enter into the slots 57 to electrically join the prongs 56 to the conductive plates 58. This relationship enables the sets of prongs 38 and 56 to be energized only when they are plugged together. Whenever this plugged relationship is separated or disconnected, then all of the prongs 38 and 56 are automatically de-energized.

Figure 9:
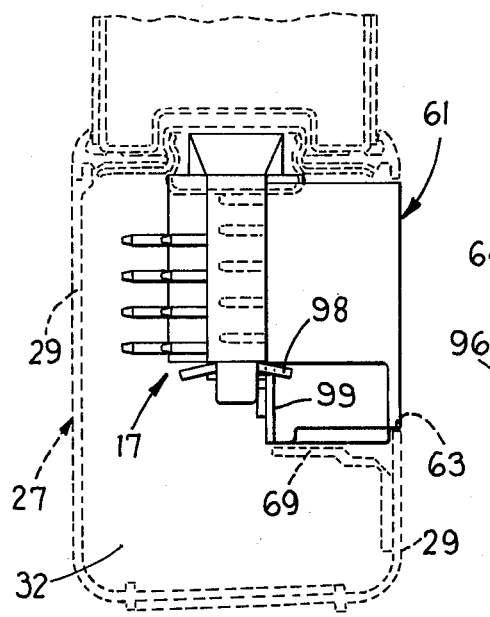
FIG. 9 is a left side view of FIG. 8.
Figure 8:
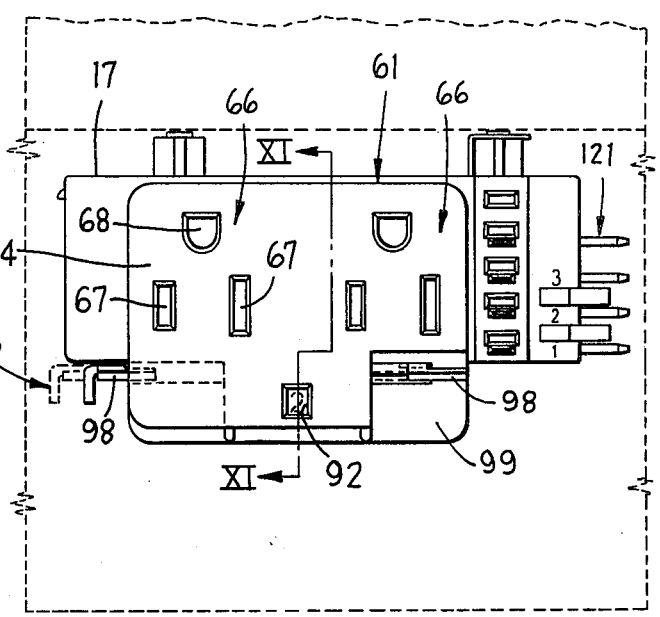
FIG. 8 is a front view showing the mounting of a power-tap (i.e., a receptacle unit) on the power block, the surrounding raceway being indicated by dotted lines.
Figure 10:
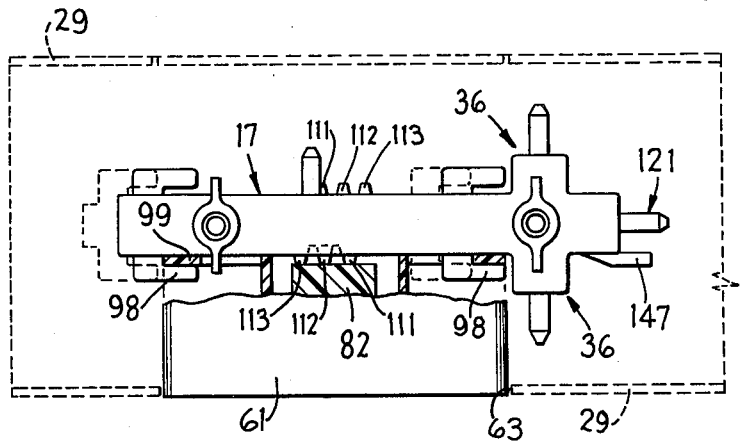
FIG. 10 is a top view of FIG. 8, with a portion of the receptacle unit being broken away and sectioned for purposes of illustration.

In the wall system of the present invention, each power block 16 and 17 as associated with each panel can have a power-tap unit, such as a receptacle unit 61 plugged into either or both sides thereof, whereby receptacle units can be positioned along the wall system, on either side thereof, at desired locations. The receptacle unit 61, as illustrated in FIGS. 8-9, is positionable within the raceway passage 32 so that the front face 64 of the receptacle unit is disposed substantially flush with the outer surface of the cover sidewall 29, for which purpose the cover is provided with a substantially rectangular opening 63 in which the receptacle unit is positioned. This opening 63 preferably has a removable cover assembly 69 or other suitable device associated therewith to close the opening 63 when the receptacle unit is not utilized.

The receptacle unit 61 includes a hollow block-like housing 62 constructed of a nonconductive material and having at least one (two in the illustrated embodiment) conventional three-hole outlets or sockets 66 associated with the front face thereof, which socket is defined in a conventional manner by means of two vertical slots 67 and an associated U-slot 68 so as to accommodate any conventional two-prong or three-prong plug.

Figure 11:
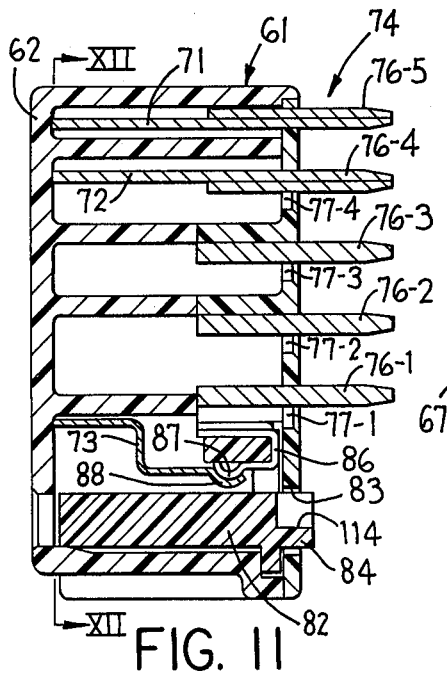
FIG. 11 is an enlarged sectional view as taken along line XI—XI in FIG. 8.

The interior of housing 62 has a first conductive plate 71 positioned therein for defining the U-shaped ground slot 68, a further conductive plate 72 for defining one of the conductive slots 67, and a further conductive plate 73 for defining the other conductive slot 67 of the cooperating pair. The rear of the receptacle unit 61 has a connector portion 74 defined thereon which, as illustrated in FIG. 11, includes five conductive prongs 76-1 through 76-5, and a plurality of slots or openings 77-1 through 77-4 associated with the respective prongs 76-1 through 76-4. The uppermost prongs 76-5 and 76-4 are respectively connected directly to the conductive plates 71 and 72, whereas the remaining prongs 76-1 through 76-3 are respectively directly connected to the conductive plates 78-1 through 78-3 as disposed within the receptacle housing.

Figure 14:
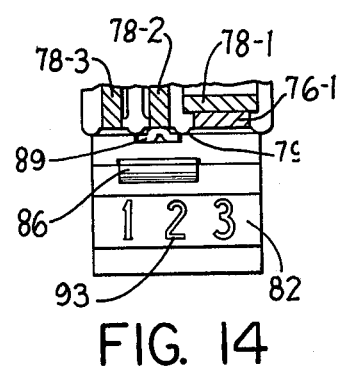
Figure 15:
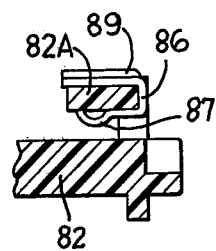
FIG. 15 is a fragmentary view of the switch member.

The conductive elements 78 are individually selectively engageable with a circuit selecting switch means 81 so that only a selected one of these three conductive elements 78 will be electrically energized. This switch means, as illustrated in FIGS. 11-15, includes a nonconductive slide 82 which is slidably disposed within the bottom interior of the receptacle housing for displacement in the longitudinal direction (that is, in a rightward or leftward direction as viewed in FIGS. 8 and 12). The slide 82 is horizontally slidably guided within the housing and has a knob-like projection 84 on the rearward end thereof which projects outwardly through an elongated slot 83 formed in the rear wall of the receptacle housing. A U-shaped conductive switch member 86 is mounted on slide 82, the lower arm of which has a curved rib 87 formed therein which is longitudinally slidably supported within a curved recess portion 88 of the conductive plate 73. The conductive switch member 86 also has an electrical contact 89 formed on the upper arm thereof, which contact is adapted to be switched into conductive engagement with the conductive elements 78. The receptacle housing has detent-like projections 79 formed thereon adjacent the lower ends of the conductive elements 78, as illustrated in FIG. 14, so that the contact 86 will be resiliently snapped and securely held in engagement with conductive element 78-2 or 78-3, or prong 76-1 (when the receptacle unit is mounted on the power block) depending on the position of the slides. This resiliency is achieved by the construction of the slide 82 which, as illustrated in FIG. 15, is provided with an upper cantilevered portion 82A having the U-shaped conductive switch member 86 mounted thereon.

Figure 12:
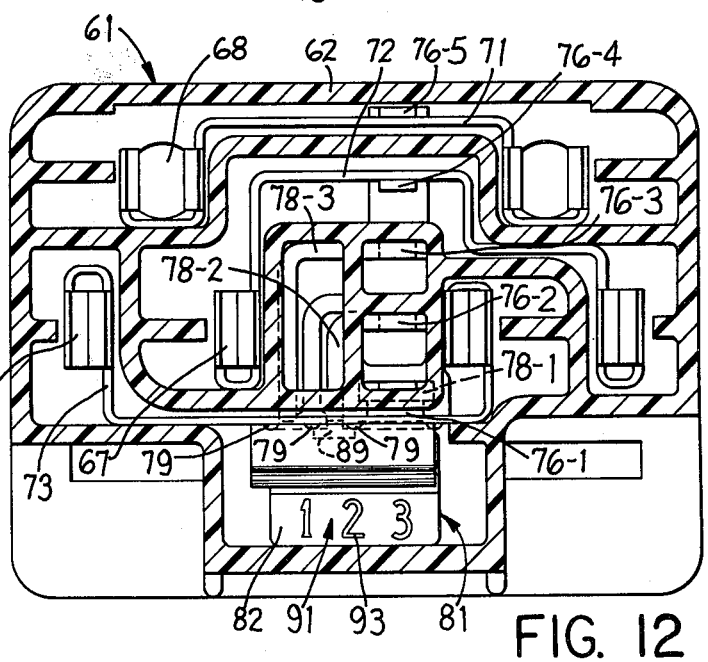
FIG. 12 is a sectional view taken along line XII—XII in FIG. 11.
Figure 13:
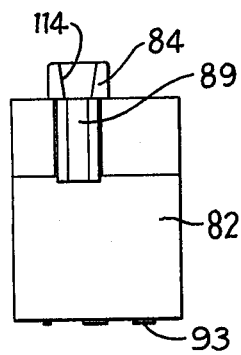
FIGS. 13 and 14 are respectively top and front views of the switch member as associated with the receptacle unit.

The switching means 81 also has circuit indicating means 91 associated therewith. For this purpose, the front wall of the receptacle housing has a small opening or window 92 formed therein directly in front of the front face of the slide 82. This front face in turn has suitable indicia 93 thereon, specifically the numerals "1", "2" and "3". One of these latter numerals is positionable in direct alignment with the window 92 depending on the positioning of the switch slide within the receptacle housing. As illustrated in FIG. 12, the switch slide is disposed so that the contact 89 engages the middlemost conductive element 78-2, whereby the numeral "2" thus appears in the window 92, as indicated in FIG. 8.

The connector portion 74 of receptacle 61 plugs into either connector portion 41R or 41L associated with any power block. When the receptacle unit 61 is separated from the connector portion 41, however, the prongs 43 associated with the connector portion 41 remain de-energized, and become electrically energized only when the prongs 76 associated with the receptacle 61 are inserted into the power block. Further, when the receptacle unit is plugged into the power block, then the knob 84 as associated with the switch slide 82 is hidden and is hence inaccessible, so that switching of the receptacle is no longer possible, such switching or circuit selection being possible only when the receptacle 61 is manually disconnected from the respective power block.

To result in positive locking of the switch slide in its selected position, the power block has three locking fingers or projections 111, 112 and 113 fixed securely to the bottom wall thereof and projecting sidewardly therefrom, there being identical sets of such projections on both sides of the power block. Similarly, the knob 84 has a recess 114 formed therein which accommodates a selected one of the projections 111–113 depending upon the position of the slide. Thus, when the receptacle unit 61 is secured to the power block, the switch slide 82 is positively secured and locked in its selected position, and hence movement of the slide from this selected position is positively prevented so long as the receptacle unit remains mounted on the power block.

To rigidly secure the receptacle unit 61 to the power block, the latter has a manually actuatable locking member 96 slidably supported thereon. This locking member 96 includes an elongated slide 97 which is slidably supported on the bottom side of the power block and is manually movably longitudinally thereof. The elongated slide has a pair of U-shaped locking tabs 98 which are integral with the slide, the locking tabs being located adjacent the forward and rearward ends thereof. When the slide is manually moved into a locking position (that is, the rightwardmost position as indicated in FIG. 8), then these locking tabs 98 overlap a portion of the rear wall 99 of the receptacle housing and prevent the receptacle unit from being unplugged from the power block. Since these locking tabs 98 project outwardly on both sides of the power block and are controlled by the same slide, they thus can be used to simultaneously lock two receptacle units to the power block as disposed on opposite sides of the latter.

The wall system of this invention is also designed to have light-fixtures selectively mounted on the individual panels, such as the fixture 116 as mounted on the panel 11 shown in FIG. 1. The mounting of such fixtures 116 on the upper edges of panels is well known, and such fixtures may incorporate either or both "task" lighting, that is downwardly directed lighting, and "ambient" lighting, that is upwardly directed lighting.

Figure 16:
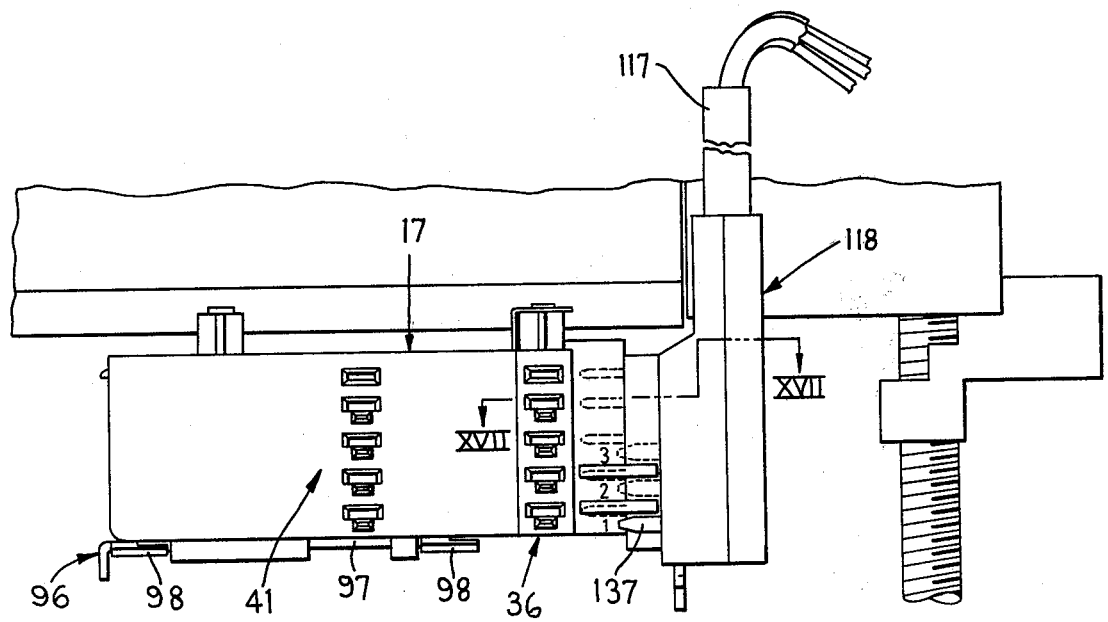
FIG. 16 illustrates a further power-tap as connected to the power block, which power-tap is associated with a panel-mounted light-fixture.

The light-fixture 116 has a conventional three-wire electrical conduit 117 (FIG. 16) attached thereto, which conduit extends interiorly of the panel, such as along the upper frame rail and then downwardly through the interior of one of the side frame rails 12', which conduit 117 terminates in a plug-like power-tap unit 118 adapted for releasable connection to an adjacent power block 17 so as to supply electrical energy to the light-fixture.

The power-tap unit 118 has a connector portion 119 associated therewith which cooperates with a compatible connector portion 121 (FIG. 2) provided on the end of the power block to form a plug-type electrical connection therebetween.

Figure 2:
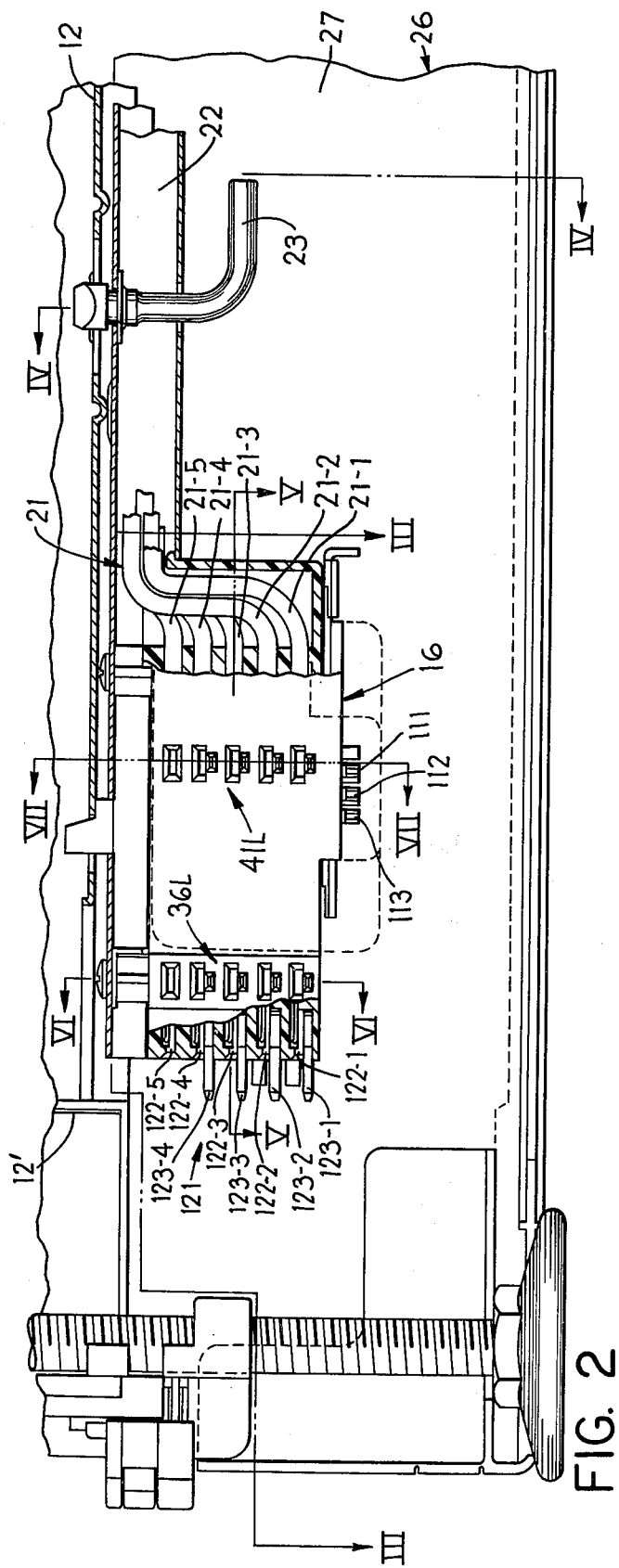
FIG. 2 is an enlarged, fragmentary, partial sectional view showing one end of the powered raceway on a single panel.

The connector portion 121 on the power block, as illustrated in FIG. 2, includes a set of five vertically spaced openings or slots 122-1 through 122-5 as formed in the power block housing, and the four lowermost slots have conductive prongs 123-1 through 123-4 associated therewith, which prongs are disposed adjacent but separated from the respective power block conductive plates 19-1 through 19-4. The connector portion 121 is thus identical to the connector portions 36 and 41.

Considering now the connector portion 119 on the power-tap 118, same includes a set of five conductive prongs 126-1 through 126-5, the four lowermost prongs having slots or openings 127-1 through 127-4 respectively associated therewith, whereby these latter prongs are normally maintained spaced and disconnected from the respective conductive elements 128-1 through 128-4 as mounted within the nonconductive housing of the connector 118.

Figure 18:
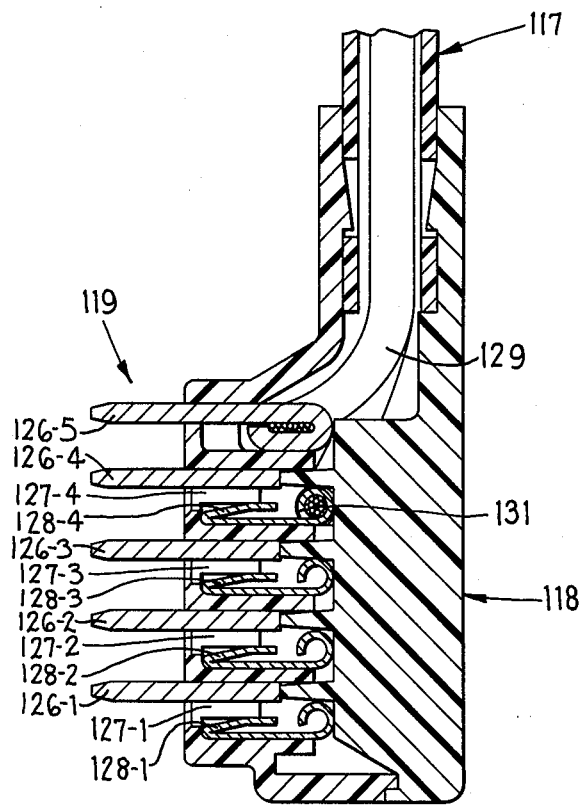
FIGS. 18 and 19 are sectional views taken along lines XVIII—XVIII and XIX—XIX, respectively, in FIG. 17.

As illustrated in FIG. 18, the ground wire 129 as associated with the three-wire conductor 117 is connected directly to the upper prong 126-5, and the second or neutral wire 131 is directly connected to the conductive element 128-4. The "hot" or third wire 132 is connected directly to a conductor 133 (FIG. 19) as mounted within the housing. This latter conductor 133 is in turn selectively connected to one of the conductive elements 128-1 through 128-3 by means of a circuit selecting switch means 134.

Figure 17:
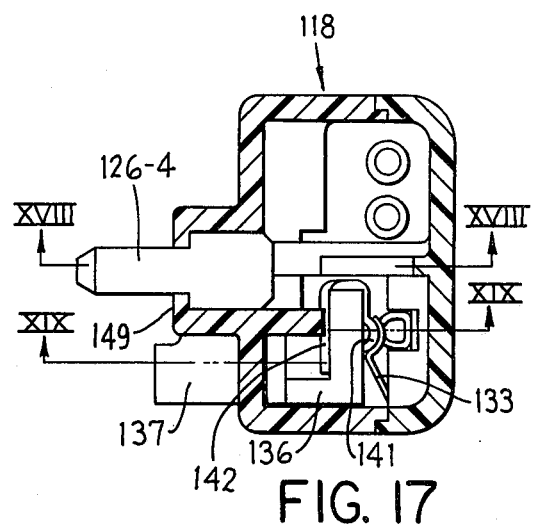
FIG. 17 is an enlarged sectional view as taken along line XVII—XVII in FIG. 16.
Figure 19:
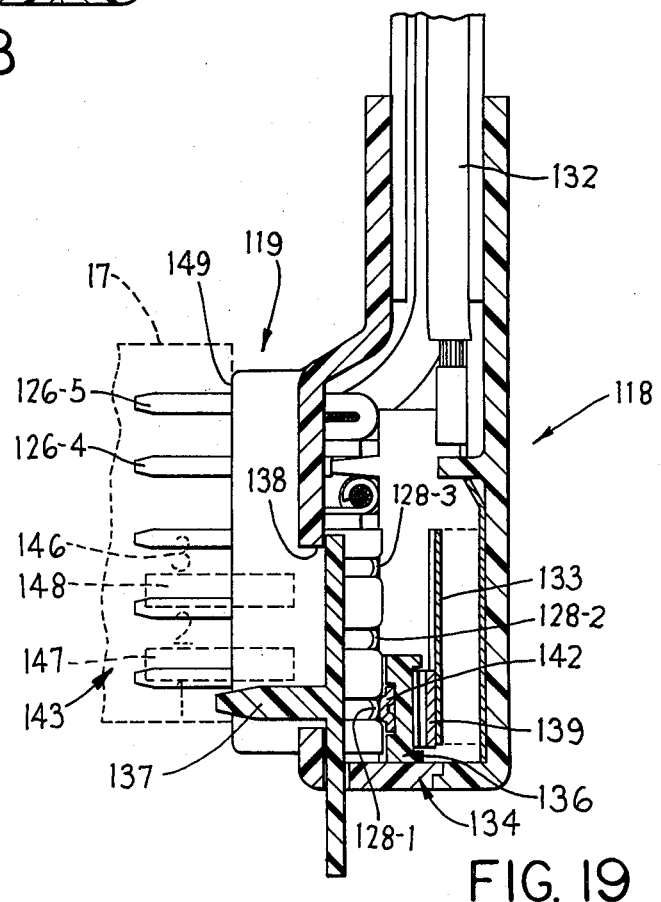

The switch means 134 includes a nonconductive slide 136 which is slidably supported within the housing so as to be manually vertically displaceable, the slide 136 being substantially U-shaped in cross section as viewed in FIG. 17. The leftwardmost leg of the slide 136 has a finger 137 which projects transversely outwardly therefrom through an elongated guide slot 138 as formed in the housing, the finger being of sufficient length to project slightly beyond the leftwardmost face of the housing as indicated in FIGS. 17 and 19. This finger 137 can be gripped so as to enable the slide 136 to be manually slidably displaced vertically into the desired position.

A U-shaped conductive switch member 139 is mounted on the rightward leg of the slide 136. This switch member 139 includes a vertically elongated arcuate rib portion 141 which is vertically slidably guided within and in electrical contact with a recessed portion associated with the conductor 133, the latter being cantilevered and hence resilient. Switch member 139 also has a contact portion 142 formed thereon which, by selective vertical displacement of the slide 134, can be moved into electrical engagement with any one of the conductive plates 128-1 through 128-3. These latter plates are suitably positioned relative to portions of the housing so that the contact 142 will engage the individual plate 128 by means of a resilient or detent-type action, whereby vertical slidable displacement of the switching means 134 will create a snap-type engagement whenever the contact 142 engages a selected one of the conductive plates 128.

The switch means 134 also has circuit indicating means 143 associated therewith, the latter being formed by suitable indicia 146 imprinted on the adjacent sidewall of the power block. These indicia 146, namely the numerals "1", "2" and "3", are vertically spaced and are disposed so that the free end of the finger 137 will point directly to one of these numerals depending upon the positioning of the switch means. Similar indicia also appear on the face 149 of the power-tap. In addition, to prevent movement of the switch means after the power-tap 118 is plugged into the power block, the latter has a pair of vertically spaced locking tabs 147-148 fixed to the sidewall of the housing, which locking tabs are disposed to vertically overlap the free end of the finger 137 so as to prevent any accidental or deliberate vertical displacement of the switch means so long as the power-tap 118 is plugged into the power block.

The wall system is electrically energized by connecting one of the power blocks as associated with any panel to an external source of electrical energy, which source may be located adjacent the ceiling, floor or sidewall of the building.

In the event that the power source is located adjacent the ceiling, then a "ceiling feed unit" is utilized for joining the power source to one of the power blocks, which unit involves five wire conductors (commonly referred to as a four-wire conductor with a ground) which extend from the power source and then interiorly through one of the panels, such as through the interior of the adjacent side frame rail, in substantially the same manner as illustrated in U.S. Pat. No. 4,060,294. This main supply conductor terminates in a plug-type connector which is identical to the light-fixture power-tap 118 illustrated in FIGS. 16–19 except that the three "hot" wires of the conductor are individually directly connected to the three lowermost conductive plates 128-1 through 128-3. This plug-type connector, as associated with the power cable which extends from the ceiling, plugs directly into the connector portion 121 associated with the end of the adjacent power block. When so connected, the same power block can be simultaneously connected to two flexible connectors 46 if desired, since the power supply connector is sandwiched between the flexible connectors.

Alternately, if the power source is located in the floor or in an adjacent sidewall, then a "base feed kit" is utilized for connecting the power source to one of the power blocks. The base feed kit also includes five wire conductors extending from the power source and terminating in a plug-type connector which would be identical to the ceiling-type connector, except that in this instance the base feed connector is positioned within the opening 63 associated with the side cover and plugs into one of the connector portions 41 associated with the power block. The use of such a base feed power supply connection is also disclosed in U.S. Pat. No. 4,060,294.

The electrical system of this invention, preferably being a five-wire system, permits the main power supply conductor to be connected to a conventional 208-volt, three-phase potential source, thus permitting the tapping off of three different 110-volt circuits.

OPERATION

The operation of the wall system, as described above, is believed self-evident, although various features thereof will be briefly described hereinafter.

After the wall system has been assembled as desired with the adjacent panels being electrically interconnected by flexible connectors 46, which connectors can be disposed on either side of the panels depending upon the angularity between adjacent panels, then the overall wall system can be suitably electrified by connecting one of the power blocks to a suitable power source, whether it be floor or ceiling mounted. In this manner, electrical energy is supplied throughout the wall system, whereupon receptacle units 61 and light-fixtures 16 can be positioned on the panels along the wall system at selected locations, which light-fixtures and receptacle units can be selectively switched during installation so as to be joined to any one of three different circuits.

With respect to the receptacle unit 61, each panel can be provided with between zero and four such power-tap units, since each power block can have a unit 61 plugged into either or both sides thereof. Prior to the mounting of the individual unit 61 on the power block, the installer initially manually moves the switch means 81 so that the respective receptacle unit will be electrically joined to selected circuit "1", "2" or "3". After this selection has been made, the receptacle unit is then plugged into the power block and is fixedly mounted thereon by appropriate manual slidable displacement of the locking member 96. In this manner, the receptacle units 61 can be individually selectively connected to any one of three different circuits, which selection can be at any random or regularly spaced interval or sequence depending upon the use and code requirements.

In the same manner, those panels having light-fixtures mounted thereon can have the light fixtures electrically selectively connected to any of the desired three circuits, this being accomplished by the installer selectively manually moving the switch means so that the power-tap 118, when plugged into the connector portion 121 of the power block, is selectively joined to one of the circuits "1", "2" or "3".

After the various power-taps have been plugged into the power blocks, the system then provides a visual indication so as to permit a quick and accurate determination as to which circuits are connected. For example, each receptacle unit readily indicates its selected circuit merely by viewing the indicia 93 through the window 92 in the front face of the receptacle unit, which indicia is visible at all times. Similarly, the indicia 146 which cooperates with the light-fixture power-tap 118 is also readily visible after the power-tap is plugged into the power block so as to permit determination as to the selected circuit, although this latter indicia will appear only when the raceway side cover is removed.

While the light-fixtures and receptacle outlets can all be randomly and selectively joined to any one of the three circuits, nevertheless most governmental building codes require that lighting-fixtures be connected to a single circuit separate from the outlets, in which case the receptacle units 61 would be selectively joined to the remaining two circuits.

The wall system of this invention thus enables adjacent panels to be electrically interconnected by means of the flexible connector 46 as indicated in FIG. 3, which connector can be disposed adjacent either side of the panels (as indicated by dotted lines) so that adjacent panels can be angularly adjusted with respect to one another in either direction. This angular adjustment can be accomplished while maintaining the flexible connector joined to the power blocks if desired. At the same time, the same power block can have a light-fixture power-tap 118 (or alternately a ceiling-type power supply connector) connected thereto as indicated by dotted lines in FIG. 3. A still further possible alternative permits a base feed power supply connector to be plugged into the power block on the side thereof opposite the flexible connector. In instances where three or more panels are to be joined at a common intersection, then electrical energy can be transferred from a single panel to an adjacent pair of panels by utilizing two identical flexible connectors 46 connected to a single power block, as illustrated in FIG. 20.

While the present invention preferably utilizes a pair of power blocks associated with each panel and flexible electrical connectors for electrically joining the power blocks of adjacent panels, nevertheless it will be appreciated that the structure of the power blocks and electrical connectors can be varied substantially while still incorporating the significant circuit-selecting power-taps of the present invention. For example, the flexible electrical connector which extends between adjacent panels could be formed as an elongated flexible conductor sheathed within flexible metal conduit, with opposite ends of the connector being releasably connectable, as by a plug structure, to the power block. In some instances, where angular flexibility is not required, then the connectors between adjacent panels can have the flexibility eliminated so that the connector is basically rigid in the longitudinal direction thereof. Further, while the use of a pair of power blocks is normally preferred in association with each panel, in some instances (particularly with narrow panels) only a single power block or terminal may be provided on each panel, whereupon the electrical connectors used for joining adjacent panels may be of increased lengths but would again be releasably joined to the terminals or power blocks of adjacent panels for transmitting electrical energy therebetween.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a space-dividing wall structure formed from a plurality of prefabricated upright panels which are serially connected together, said wall structure including a prewired electrical system associated therewith and extending longitudinally therealong, said electrical system including a pair of power blocks mounted on each panel adjacent the opposite vertical edges thereof and multiple-conductor electrical cable means extending interiorly of each panel and connected between said pair of power blocks for defining at least two electrical circuits, said electrical system also including electrical connector means releasably connected between the opposed power blocks of adjacent panels for electrically connecting the adjacent panels together so that said two electrical circuits extend longitudinally throughout the plurality of serially-connected panels, each said power block having a connector portion associated therewith, and an electrical power-tap releasably joined to said connector portion of at least one power block, said power-tap having an inlet portion for electrical connection to said power block and an outlet portion adapted for supply of electrical energy to a circuit or device disposed externally of the wall structure, the improvement comprising circuit-selecting switch means associated with said power-tap for permitting the outlet portion thereof to be selectively electrically joined to either one of said two circuits as associated with said electrical system but not to both at the same time, said switch means including a manually movable switch member movably supported on said power-tap, said manually movable switch member being movable solely when the power-tap is disconnected from the power block, and said power-tap creating a plug-like releasable connection with the power block.

2. A wall structure according to claim 1, including indicia means for indicating which circuit is connected to the outlet portion of the power-tap when the latter is connected to the power block, said indicia means being visible when the power-tap and power block are connected together.

3. A wall structure according to claim 1 or claim 2, including lock means coacting between said power-tap and said power block for preventing switchable displacement of the switch member when the power-tap and power block are connected together.

4. A wall structure according to claim 1, wherein said power-tap includes a block-like housing, said inlet portion being sssociated with one side of said housing and said outlet portion being associated with another side thereof, said outlet portion comprising a conventional three-hole receptacle for accommodating a conventional two-prong or three-prong electrical plug.

5. A wall structure according to claim 1, wherein the outlet portion of said power-tap comprises multipleconductor electric cable means which is connected to a light fixture as disposed externally of the panel.

6. A wall structure according to claim 1, including cooperating lock means coacting between the power block and the movable switch member for preventing movement of the latter when the power-tap and power block are connected together, and indicia means associated with the switch member for visually indicating the circuit to which the outlet portion of the power-tap is connected.

7. A wall structure according to claim 1, wherein the input portion of the power-tap includes a set of at least four electrically conductive prongs or blades adapted for electrical engagement with the power block, the outlet portion of said power-tap including at least three conductive members, two of said conductive members being adapted for electrical interconnection to two of said prongs, the remaining electrically conductive member being adapted for selected electrical connection to the remaining two prongs through said switch means.

8. In an upright wall panel having electrical terminal means fixedly mounted thereon and disposed between a pair of substantially parallel vertical planes as defined by the opposed side surfaces of the panel, said panel also having electrical cable means associated therewith and disposed between said parallel planes, said cable means including a plurality of individual electrical conductors connected to said terminal means so as to define at least two different electrical circuits, and a small portable receptacle unit releasably connected to said terminal means, said receptable unit defining therein a conventional three-hole electrical receptacle for accommodating a conventional two-prong or three-prong plug, said receptacle being electrically connected to said terminal means when said receptacle unit is connected to said terminal means, comprising the improvement wherein said receptacle unit includes manually selectable switch means for permitting the receptacle to be selectively electrically joined to any one of the circuits associated with the terminal means when the latter has the receptacle unit connected thereto, and wherein said receptacle unit includes a housing having a plurality of electrical contact portions mounted thereon and defining said receptacle, said switch means including a manually movable switch member movably supported on said housing, and means for preventing movement of said switch member when the receptacle unit is connected to said terminal means, whereby said switch member can be movably displaced only when said receptacle unit is disconnected from said terminal means.

9. A panel according to claim 8, wherein said receptacle unit includes a front wall associated with said housing which is positioned substantially flush with one of the side surfaces of the panel when the receptacle unit is connected to said terminal means, said front wall having said three-hole receptacle associated therewith.

10. A panel according to claim 8, wherein said terminal means and said receptacle unit have cooperating guide structure so that said receptacle unit connects to said terminal means by a plug-type connection.

11. A panel according to claim 8, wherein said movement preventing means includes locking means coacting between said terminal means and said receptacle unit for preventing movement of said switch member whenever the receptacle unit and terminal means are joined together.

12. A panel according to claim 8, including indicia means associated with said receptacle unit when the latter is mounted on the terminal means for visually determining which circuit is selectively connected to said receptacle.

13. In a space-dividing wall structure formed from a plurality of prefabricated upright panels which are serially connected together, said wall structure including an electrical system associated therewith and defining at least two different electrical circuits which extend substantially in parallel longitudinally throughout said serially-connected panels, said electrical system including electrical terminal means fixedly mounted on adjacent panels, said terminal means including a plurality of electrically conductive elements capable of defining said two circuits, said electrical system also including electrical conductor means releasably connected between the terminal means of adjacent panels for electrically connecting the adjacent panels together so that said two electrical circuits extend longitudinally throughout said plurality of series-connected panels, the opposite ends of said connector means being structurally and electrically connected to the terminal means by a releasable plug-like connection, and a portable electrical receptacle unit for defining a conventional multiple-hole electrical receptacle which opens sidewardly of the panel for accommodating a conventional electrical plug, the receptacle unit being releasably joined to said terminal means for connection to at least one of said circuits, the improvement comprising manually movable switch means mounted on and associated with said receptacle unit for permitting said receptacle to be selectively connected to either of said circuits but not to both at the same time, said switch means including a manually movable switching member which is movably accessible for effecting switching between said circuits only when said receptacle unit is disconnected from said terminal means.

14. A wall structure according to claim 13, wherein said receptacle is defined by three electrical contacts, first and second of said contacts being electrically connected to first and second of said conductive elements, said third contact being selectively connectable to either of the third and fourth said conductive elements, said switch means including a manually movable switch member selectively positionable for joining said third contact to either of said third and fourth conductive elements.

15. In a space-dividing wall structure formed from a plurality of prefabricated upright panels which are serially connected together, said wall structure including a prewired electrical system associated therewith and extending longitudinally therealong, said electrical system including a pair of power blocks mounted on each panel adjacent the opposite vertical edges thereof and multiple-conductor electrical cable means extending interiorly of each panel and connected between said pair of power blocks for defining at least two electrical circuits, said electrical system also including electrical connector means releasably connected between the opposed power blocks of adjacent panels for electrically connecting the adjacent panels together so that said electrical circuits extend longitudinally throughout the plurality of serially-connected panels, each said power block having a connector portion associated therewith, and an electrical power-tap releasably joined to said connector portion, said power-tap having an inlet portion for electrical connection to said power block and an outlet portion adapted for supply of electrical energy to a circuit or device disposed externally of the wall structure, the improvement comprising:

circuit-selecting switch means associated with said power-tap for permitting the outlet portion thereof to be selectively electrically joined to either one of said circuits as associated with said electrical system; and said power block including a pair of identical first connector portions located adjacent the opposite sides of the power block and each being adpted to create a plug-type connection with a said electrical connector, a pair of identical second connector portions located adjacent the opposite sides of the power block and each being adapted to create a plug-type connection with a said power-tap, and a third connector portion disposed adjacent the end of said power block which is closest to the adjacent vertical edge of the respective panel, said third connector portion being adapted to create a plug-type connection with a further said power-tap.

16. A wall structure according to claim 15, wherein said second and third connector portions are identical.

17. In a space-dividing wall structure formed from a plurality of prefabricated upright panels which are serially connected together, said wall structure including a prewired electrical system associated therewith and extending longitudinally therealong, said electrical system including a pair of power blocks mounted on each said panel adjacent the opposite vertical edges thereof and multiple-conductor electrical cable means extending interiorly of each panel and connected between said pair of power blocks for defining at least two electrical circuits, said electrical system also including electrical connector means releasably connected between the opposed power blocks of adjacent panels for electrically connecting the adjacent panels together so that said two electrical circuits extend longitudinally throughout the plurality of serially connected panels, said power block having a pair of first connector portions located thereon in sidewardly spaced relationship and each being adapted to create a pluglike connection with a said electrical connector, and said power block having a second connector portion thereon, comprising the improvement wherein a small portable electrical power-tap unit is releasably joined to said second connector portion, said power-tap unit having an inlet portion for creating a pluglike connection with said second connector portion for electrically connecting said power-tap unit to at least one of the circuits associated with the power block, said power-tap unit having an outlet portion defining a single electrical circuit adapted for supply of electrical energy to a circuit or device disposed externally of the wall structure, said power-tap unit having circuit-selecting switch means mounted thereon and associated therewith for permitting the outlet portion to be selectively electrically joined to either one of said two circuits associated with said power block but not to both circuits at the same time, and said power block having a third connector portion disposed adjacent the end thereof which is closest to the adjacent vertical edge of the respective panel, and a further power-tap unit being releasably connected to said third connector portion by means of a pluglike connection so that said further power-tap unit is electrically connected to a different electrical circuit as associated with said power block, said further power-tap unit also having circuit-selecting switch means movably mounted thereon and associated therewith.

18. A wall structure according to claim 17, wherein said first-mentioned power-tap unit has the outlet portion thereof defining a multiple-hole electrical receptacle adapted for engagement with a conventional electrical plug, and wherein said further power-tap unit has an outlet portion defined by a multiconductor electrical cable which is connected to a light fixture.

19. In an upright wall panel having electrical terminal means fixedly mounted thereon and disposed between a pair of substantially parallel vertical planes as defined by the opposed side surfaces of the panel, said panel also having electrical cable means associated therewith and disposed between said parallel planes, said cable means including a plurality of individual electrical conductors connected to said terminal means so as to define at least two different electrical circuits, said terminal means having a connector portion associated therewith, and a small portable electrical power-tap unit releasably joined to said connector portion, said power-tap unit having an inlet portion for electrical connection to said terminal means and an outlet portion defining a single electrical circuit adapted for supply of electrical energy to a circuit or device disposed externally of the wall structure, the improvement comprising circuit-selecting switch means movably mounted on and associated with said power-tap unit for permitting the outlet portion to be selectively electrically joined to either one of said two circuits but not to both at the same time, said switch means including a manually movable switch member which is movably accessible for permitting selective switching of circuits only when the power-tap unit is electrically disconnected from the power block.

* * * * *

UNITED STATES PATENT AND TRADEMARK OFFICE
CERTIFICATE OF CORRECTION

PATENT NO. : 4 367 370
DATED : January 4, 1983
INVENTOR(S) : Harold R. Wilson and Ditmar K. Tillmann It is certified that error appears in the above—identified patent and that said Letters Patent is hereby corrected as shown below:

Col. 16, line 67; change "power block" to ---terminal means---.

Signed and Sealed this

Tenth Day of May 1983

[SEAL]

Attest:

Attesting Officer

GERALD J. MOSSINGHOFF
Commissioner of Patents and Trademarks

REEXAMINATION CERTIFICATE (704th)
United States Patent [19]
Wilson et al.

[11] B1 4,367,370
[45] Certificate Issued Jun. 9, 1987

[54] POWER PANEL SYSTEM WITH SELECTIVE MULTIPLE CIRCUITS

[75] Inventors: Harold R. Wilson; Ditmar K. Tillmann, both of Holland, Mich.

[73] Assignee: Haworth Mfg. Inc., Holland, Mich.

Reexamination Request:
No. 90/001,028, Jun. 6, 1986

Reexamination Certificate for:
Patent No.: 4,367,370
Issued: Jan. 4, 1983
Appl. No.: 44,514
Filed: Jun. 1, 1979

Certificate of Correction issued May 10, 1983.

[51] Int. Cl.$^4$ ............................................. H02G 3/28
[52] U.S. Cl. ................................. 174/48; 160/127; 200/51.06; 307/38

[56] References Cited

U.S. PATENT DOCUMENTS

| | | | |
|---|---|---|---|
| 1,870,762 | 8/1932 | Winter | 200/51.05 |
| 2,313,452 | 3/1943 | O'Brien | 339/23 |
| 3,715,627 | 2/1973 | D'Ausilio | 361/357 |
| 3,832,503 | 8/1974 | Crane | 200/51 R |
| 3,993,385 | 11/1976 | Seger | 339/21 R |
| 4,043,626 | 8/1977 | Propst et al. | 339/23 |
| 4,056,297 | 11/1977 | Gartung | 339/23 |
| 4,060,294 | 11/1977 | Haworth et al. | 339/4 |
| 4,108,523 | 8/1978 | Bolis | 339/22 B |
| 4,135,775 | 1/1979 | Driscoll | 339/22 R |
| 4,199,206 | 4/1980 | Haworth et al. | 339/4 |
| 4,203,639 | 5/1980 | VandenHoek et al. | 339/22 R |
| 4,231,630 | 11/1980 | Propst et al. | 339/22 R |
| 4,239,932 | 12/1980 | Textoris et al. | 174/48 |
| 4,278,834 | 7/1981 | Boundy | 174/48 |
| 4,382,648 | 5/1983 | Propst et al. | 339/18 P |
| 4,429,934 | 2/1984 | VandenHoek et al. | 339/22 R |

FOREIGN PATENT DOCUMENTS

1579078  7/1969  France ............................ 339/32 M

OTHER PUBLICATIONS

Brochure entitled "Westinghouse ASD Power and Communications Distribution System".
Brochure Entitled "Steelcase", 1978.

*Primary Examiner*—A. T. Grimley

[57] ABSTRACT

A panel-type wall system wherein each panel has a pair of electrically connected power blocks disposed adjacent the lower corners thereof. The opposed power blocks of adjacent panels are electrically joined together by a flexible electrical connector which plugs into adjacent power blocks. The power blocks and connectors define an electrical system which extends longitudinally throughout the series of connected panels. The electrical system is preferably a five-wire system to provide three different available circuits at each power block. Each power block is provided with several connector portions for permitting electrical power to be tapped therefrom. Different types of power-taps can be plugged into the power blocks. More specifically, the power-taps include a receptacle unit which can be selectively plugged into either or both sides of each power block, and a light-fixture plug which can also be plugged into each power block. Each of these power-taps has a simple manually actuatable switch associated therewith so the power-tap, when plugged into the power block, can be electrically joined to any selected one of the three circuits. The power-tap also provides a visual indication as to which circuit has been selected.

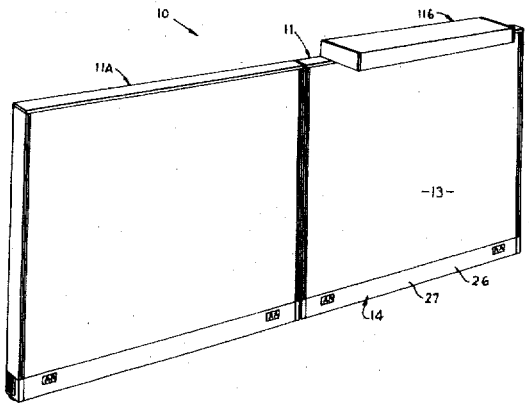

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–14 and 19 is confirmed.

Claims 15 and 17 are determined to be patentable as amended.

Claims 16 and 18, dependent on an amended claim, are determined to be patentable.

15. In a space-dividing wall structure formed from a plurality of prefabricated upright panels which are serially connected together, said wall structure including a prewired electrical system associated therewith and extending longitudinally therealong, said electrical system including a pair of power blocks mounted on each panel adjacent the opposite vertical edges thereof and multiple-conductor electrical cable means extending interiorly of each panel and connected between said pair of power blocks for defining at least two electrical circuits, said electrical system also including electrical connector means releasably connected between the opposed power blocks of adjacent panels for electrically connecting the adjacent panels together so that said electrical circuits extend longitudinally throughout the plurality of serially-connected panels, each said power block having a connector portion associated therewith, and an electrical power-tap releasably joined to said connector portion, said power-tap having an inlet portion for electrical connection to said power block and an outlet portion adapted for supply of electrical energy to a circuit or device disposed externally of the wall structure, the improvement comprising:

circuit-selecting switch means associated with said power-tap for permitting the outlet portion thereof to be selectively electrically joined to either one of said circuits as associated with said electrical system, *said circuit-selecting switch means being accessible to permit selective switching of circuits only when the power-tap is disconnected from said power block*; and said power block including a pair of identical first connector portions located adjacent the opposite sides of the power block and each being [adpted] *adapted* to create a plug-type connection with a said electrical connector, a pair of identical second connector portions located adjacent the opposite sides of the power block and each being adapted to create a plug-type connection with a said power-tap, and a third connector portion disposed adjacent the end of said power block which is closest to the adjacent vertical edge of the respective panel, said third connector portion being adapted to create a plug-type connection with a further said power-tap.

17. In a space-dividing wall structure formed from a plurality of prefabricated upright panels which are serially connected together, said wall structure including a prewired electrical system associated therewith and extending longitudinally therealong, said electrical system including a pair of power blocks mounted on each said panel adjacent the opposite vertical edges thereof and multiple-conductor electrical cable means extending interiorly of each panel and connected between said pair of power blocks for defining at least two electrical circuits, said electrical system also including electrical connector means releasably connected between the opposed power blocks of adjacent panels for electrically connecting the adjacent panels together so that said two electrical circuits extend longitudinally throughout the plurality of serially connected panels, said power block having a pair of first connector portions located thereon in sidewardly spaced relationship and each being adapted to create a pluglike connection with a said electrical connector, and said power block having a second connector portion thereon, comprising the improvement wherein a small portable electrical power-tap unit is releasably joined to said second connector portion, said power-tap unit having an inlet portion for creating a pluglike connection with said second connector portion for electrically connecting said power-tap unit to at least one of the circuits associated with the power block, said power-tap unit having an outlet portion defining a single electrical circuit adapted for supply of electrical energy to a circuit or device disposed externally of the wall structure, said power-tap unit having circuit-selecting switch means mounted thereon and associated therewith for permitting the outlet portion to be selectively electrically joined to either one of said two circuits associated with said power block but not to both circuits at the same time, *said circuit-selecting switch means being accessible to permit selective switching of circuits only when the power-tap unit is disconnected from said power block*, and said power block having a third connector portion disposed adjacent the end thereof which is closest to the adjacent vertical edge of the respective panel, and a further power-tap unit being releasably connected to said third connector portion by means of a pluglike connection so that said further power-tap unit is electrically connected to a different electrical circuit as associated with said power block, said further power-tap unit also having circuit-selecting switch means movably mounted thereon and associated therewith *and accessible to permit switching of circuits only when said further power-tap unit is disconnected from said power block.*

* * * * *